(12) United States Patent
Kluft et al.

(10) Patent No.: US 6,732,056 B2
(45) Date of Patent: May 4, 2004

(54) METHOD AND DEVICE FOR MONITORING THE WEAR CONDITION OF A TOOL

(75) Inventors: Werner Wilhelm Kluft, Aachen (DE); Martin Josef Reuber, Aachen (DE); Heinz-Hubert Kratz, Aachen (DE)

(73) Assignee: Prometech GmbH, Aachen (DE)

( * ) Notice: Subject to any disclaimer, the term of this patent is extended or adjusted under 35 U.S.C. 154(b) by 248 days.

(21) Appl. No.: 09/854,660

(22) Filed: May 15, 2001

(65) Prior Publication Data

US 2002/0017139 A1 Feb. 14, 2002

(30) Foreign Application Priority Data

May 15, 2000 (EP) .............................................. 00110365

(51) Int. Cl.$^7$ .............................................. G06F 19/00
(52) U.S. Cl. ...................................................... 702/39
(58) Field of Search .............................. 702/39, 54, 59, 702/67, 75, 34, 35, 105, 182, 183, 185; 700/175, 176; 73/104

(56) References Cited

U.S. PATENT DOCUMENTS 4,744,242 A * 5/1988 Anderson et al. .............. 73/104

FOREIGN PATENT DOCUMENTS

JP 9323239 A 12/1997

* cited by examiner

*Primary Examiner*—Michael Nghiem
(74) *Attorney, Agent, or Firm*—Diller, Ramik & Wight

(57) ABSTRACT

The wear condition of a milling tool is determined by detecting vibrations of the milling tool and a metal workpiece and generating wavelet coefficients which are utilized to evaluate the wear condition of the workpiece. The vibrations are detected at several locations along the metal workpiece or upon a different workpiece under comparable conditions and evaluating workpiece wear on the basis of changes in wear condition parameters at different locations and/or comparable cutting engagement between the milling tool and similar or different workpieces.

26 Claims, 3 Drawing Sheets

METHOD AND DEVICE FOR MONITORING THE WEAR CONDITION OF A TOOL

BACKGROUND OF THE INVENTION

The invention relates to a method and a device for monitoring the wear condition of a tool during machining of a metal workpiece by means of a machine tool.

Said wear monitoring process aims at deducing the wear progress of the tool from the sensor signal detected during the machining process. For this purpose sensors are installed in the working space of the machine tools such that the wear condition of the tool can be deduced from the detected sensor signal.

From JP 9323239 A a wear detector for lathe tools and a monitoring process are known, wherein the torsion moment acting upon the tool is measured and the measuring signals are supplied to a wavelet converter. By transforming the measuring signals from the sensor into wavelet coefficients with the aid of a wavelet function parameters can be determined which are representative of the wear condition.

SUMMARY OF THE INVENTION

It is an object of the present invention to improve the aforementioned process and the aforementioned device such that a quantitative and qualitative analysis of the wear condition with improved reproducibility is possible.

The present invention advantageously provides for reception by at least one vibration sensor of the vibrations, which are generated during the machining process, of a vibration system comprising at least the tool and the metal workpiece. The analysis of the vibration signal is more sensitive by approximately a factor of 50 with regard to the wear condition of the tool thus allowing a statement, which is exacter in terms of quantity and quality, on the wear condition of the tool. The determined wear condition parameters allow an evaluation of the wear progress at differerent locations of the tool. This is particularly important in the case of difficult-to-machine workpieces where it is essential that the workpiece is machined without any exchange of tool taking place. In this manner it can be decided prior to commencement of machining of a new workpiece whether a tool needs to be exchanged. The vibration analysis is superior to a large extent to the measurement of a torque or force signal since the changes in the force or torque signals do not necessarily allow conclusions to be drawn with regard of the wear condition, and said changes may be due to other reasons.

The vibration signal may be detected in the three-dimensional space in at least one space axis.

According to a partcularly preferrred aspect the vibration signal is detected in all three space axes. The wear condition parameters detected along the three space axes allow detection of the wear locations along the area of contact between the tool and the workpiece and/or along the cutting edge of the tool. In this manner a qualitative evaluation of the wear condition is possible and it can, e.g., be determined whether the tool is still usable for certain applications.

The three-dimensional vibration signal can be individually evaluated in each space axis, which results in a respective direction-oriented vibration signal. By means of the wavelet function respective direction-oriented wear condition parameters can be determined from the respective wavelet coefficient.

The three-dimensional vibration signal can be individually evaluated in each space axis, wherein after transformation of the three direction-oriented vibration signals a single resultant wear condition parameter can be determined from the wavelet coefficients in each space axis by means of the wavelet function, e.g. by addition, ratio formation, multiplication or vector addition.

According to another alternative the three-dimensional vibration signal can be individually evaluated in each space axis, wherein after transformation of the three direction-oriented vibration signals three wear condition parameters are determined from the respective wavelet coefficient by means of the wavelet function, the three wear condition parameters being combined, e.g. by addition, ratio formation or multiplication, to form a single wear condition parameter.

Alternatively, the vibration signal can be detected on the workpiece, the workpiece receiving means or the machine tool components directly or indirectly supporting the workpiece receiving means.

An acceleration sensor, a vibration velocity sensor, a vibration path sensor or, in the higher-frequency range, a solid-borne sound sensor or a sound emission sensor may be used as a vibration sensor.

Preferably, the wear condition of a workpiece is monitored during machining with interrupted cut.

A particularly preferred application is the wear condition monitoring of a milling tool during free-form milling.

The monitoring process can be e.g. applied during finish milling using a spherical milling tool. Here, the tool is exposed to different contact conditions due to permanently varying contact surfaces.

In the case of repeated machining actions on similar workpieces the wear condition can be evaluated on the basis of the change in the wear condition parameter relative to an initial parameter or relative to a given limit parameter at comparable cutting, engagement and/or contact conditions between tool and workpiece on similar or different workpieces.

In the field of tool manufacture frequently only a single formed part is produced such that it is necessary to define the given measuring locations with comparable cutting, engagement and/or contact conditions on one and the same workpiece.

The given measuring locations with comparable cutting, engagement and/or contact conditions between tool and workpiece can be determined from data contained in an NC production program of the machine tool, for which purpose e.g. the path and position data can be used. These measuring locations can be determined by a software which analyzes the NC production program in a computer (postprocessor). Said software may e.g. supplement the NC production program by program steps at the determined comparable measuring locations, said program steps allowing identification of the comparable measuring locations. Thus the NC production program can control an evaluation unit which compares and evaluates the wear parameters at the given measuring locations.

The software for analyzing the NC production program may further be capable of classifying a plurality of different comparable measuring locations, said measuring locations comprising different contact zones between tool and workpiece along the cutting edge of the tool but nevertheless comprising similar or comparable cutting and engagement conditions.

The given measuring locations with comparable cutting, engagement and/or contact conditions between tool and workpiece can be determined as a function of one or a plurality of the following parameters, namely workpiece blank geometry, workpiece finished part geometry, intermediate cut surfaces, machining parameters and tool geometry.

According to a preferred aspect of the present invention it is provided that, as a function of the wear condition parameters, the wear condition of the tool is indicated in terms of quantity on a two-dimensional or three-dimensional representation of the tool along the cutting edge of the tool. The representation of the tool can e.g. be shown on a display unit of the tool machine and the wear zones can be marked on the tool contour. On the basis of the optically displayed qualitative and quantitative wear condition an operator can decide in time whether the tool needs to be exchanged.

BRIEF DESCRIPTION OF THE DRAWINGS

Hereunder an embodiment of the present invention is explained in detail with reference to the drawings in which.

DESCRIPTION OF THE PREFERRED EMBODIMENTS

Figure 1:
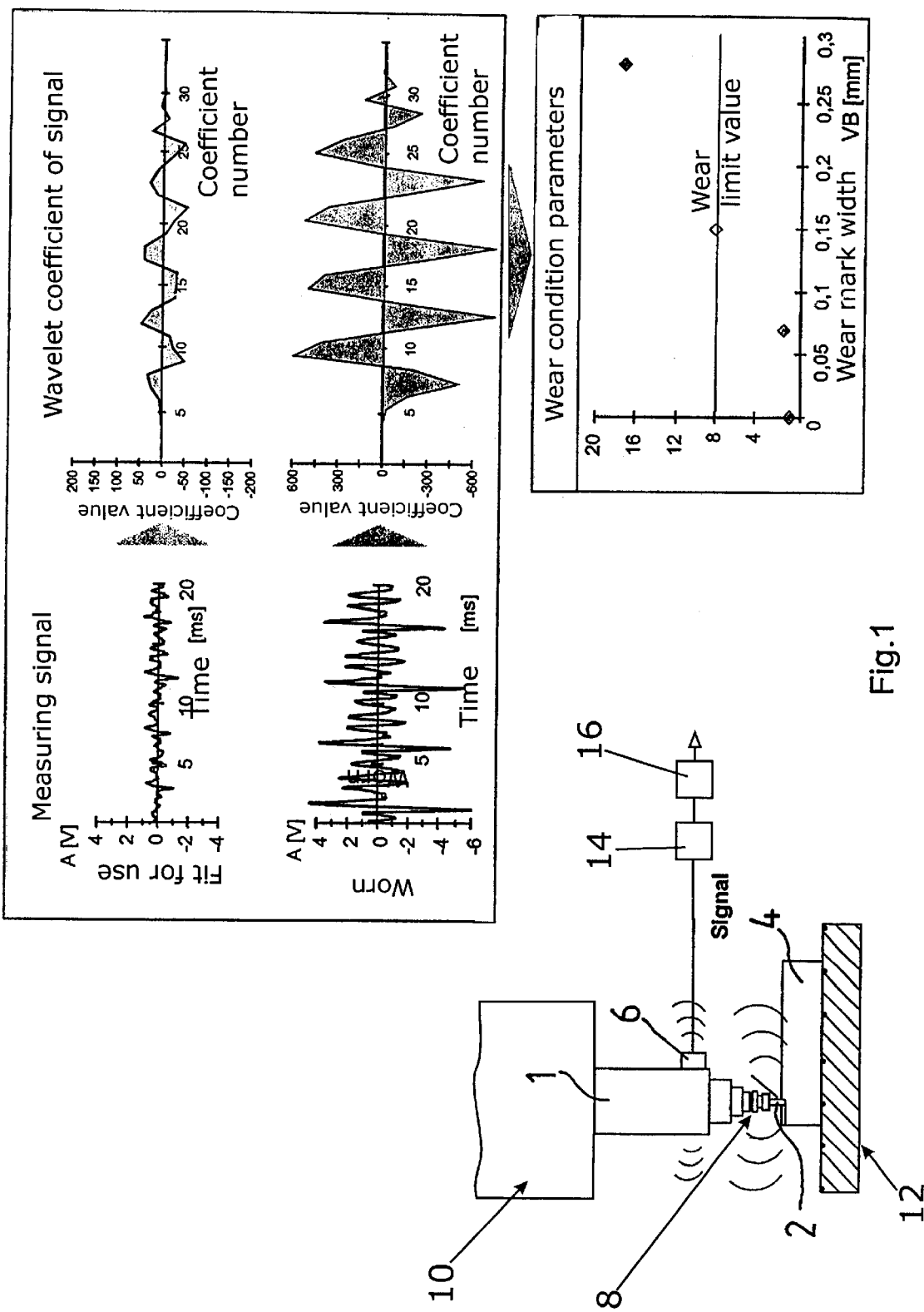
FIG. 1 shows a representation of a comparison of a fit-for-use tool with a worn tool.

The schematic representation next to the graphical representation of FIG. 1 shows the machining of a workpiece 4 using a tool 2, preferably a milling tool of a tool machine 1. For the sake of clarity only the housing of the machine spindle of the tool machine 1 is shown, a vibration sensor 6 being fastened to said housing, said vibration sensor 6 detecting the vibration signals produced during the machining process. The detected vibration signals are emitted by a vibration system comprising at least the tool 2 and the metal workpiece 4. The vibration sensor 6 may also be fastened to another location of the tool machine, wherein the place of fastening should be as near to the contact location between tool 2 and workpiece 4 so that the vibration signal is not excessively attenuated. Particularly preferred is the use of a three-dimensional vibration sensor 6 which allows direction-oriented detection of the vibration signal.

The time-related signal patterns detected by the vibration sensor 6 measure the vibrations caused by the excitations generated during the machining process. To emphasize signal characteristics which change to a particularly large extent with the wear of the tool, the signal is transformed by means of the wavelet analysis. The wavelet analysis is published e.g. in: M. Holschneider, R. Kronland-Martinet, J. Morlet, Ph. Tchamitchian: "A Real Time Algorithm For Signal Analysis with the Help of Wavelet-Transform", in Wavelets, Time-Frequency Methods and Phase Space, J. M. Combes, A. Grossmann and Ph. Tchamitchian, Eds. Berlin: Springer, ITPI 1989, pages 286 to 297.

For example, the wavelet transformation can be performed according to the Daubechies method (Daubechies: The wavelet transform, time-frequency localization and signal analysis. IEEE Transactions on Information Theory 36(5) (1990), pages 961 to 1005).

FIG. 1 shows a comparison of the measuring signal of a fit-for-use tool with that of a worn tool 2. Said measuring signals are subjected to a wavelet transformation. The wavelet coefficients of the vibration signal are the result of the wavelet transformation, the level and distribution of the coefficients of fit-for-use tools and tools displaying different degrees of wear clearly differing from each other. The resultant patterns of the wavelet coefficients are compressed to form wear parameters or used as a basis for calculating the wear parameters which can be employed for evaluating the wear condition of the tool. If the wear condition parameters exceed defined limit values (indicated as wear limit value in the drawing), the tool is to be considered a worn tool.

From the representation of FIG. 1 showing the wavelet coefficients of the vibration signal for comparison purposes it can be seen that the coefficient of a worn tool 2 rises to considerably higher values than that of a fit-for-use tool. The representations show the respective coefficient value as a function of the coefficient number. From the wavelet coefficient the wear condition parameters can be calculated. The lower representation of FIG. 1 shows the dependence of the wear condition parameters on the wear mark width. The representation further contains a wear limit value, and when this limit value is reached, the tool 2 should be exchanged.

When free formed surfaces are milled, permanently changing cutting, engagement and/or contact conditions between tool 2 and workpiece 4 occur during the machining process due to the complex geometry of the machined workpieces.

Figure 2:
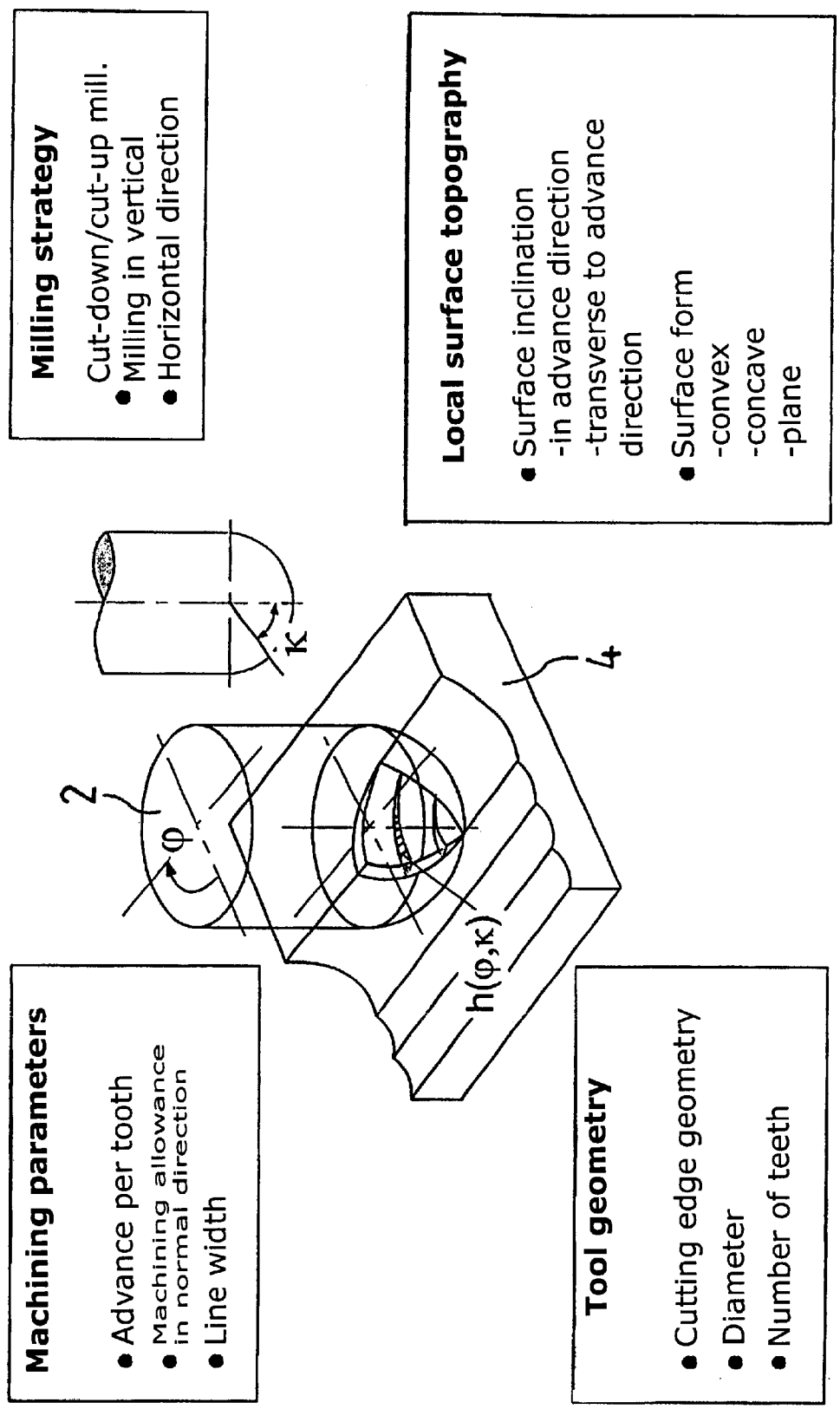
FIG. 2 shows the cutting, engagement and contact conditions between tool and workpiece and their influencing variables.

The influencing variables shown in FIG. 2 lead to different contact conditions and changing chip-formation mechanisms. Above all, the variation of geometrical parameters, e.g. the orientation between tool axis and workpiece surface, influence to a large extent the paths of movement of the individual cutting edge points through the material volume to be removed. Depending thereon changing patterns of the width and thickness of cut occur during engagement of the cutting edge thus leading to changed dynamic excitations generated during the machining process, the effects of which are detected by the vibration sensor 6.

In FIG. 2 the variables influencing the cutting, engagement and/or contact conditions during the milling of freely formed surfaces are shown.

Important influencing variables are the machining parameters, the milling strategy, the tool geometry and the local surface topography.

Figure 3:
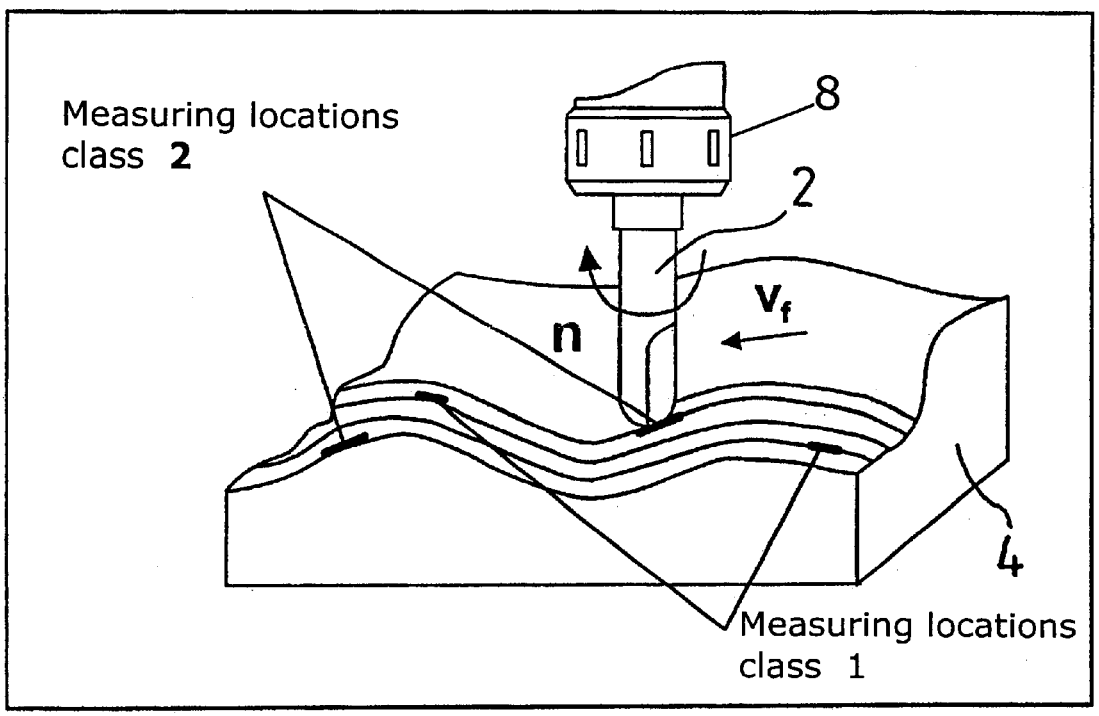
FIG. 3 shows a schematic representation of the determination of comparable measuring locations.

For consideration of the changing cutting, engagement and contact conditions during wear condition evaluation the analysis of the wear condition is performed at defined measuring locations of the workpiece 4. The mesuring location analysis aims at carrying out the wear analysis at a plurality of different contact zones along the cutting edge of the tool at similar or comparable cutting, engagement and contact conditions in one or different workpieces 4. For this purpose information on the geometry of the workpiece 4 and the tool 2 as well as their orientation relative to each other is required, said information being available in an NC production program of the corresponding machine tool 1. The cutting, engagement and contact conditions occurring during the machining process can be combined in classes of similar or comparable machining situations as is shown by way of example in FIG. 3. On the basis of the NC program data and the description of these defined measuring-location classes suitable contact zones along the cutting edge of the tool are determined and used for wear condition evaluation purposes. At the measuring locations belonging to a measuring-location class the wear condition parameters are analyzed by comparison such that the wear progress can be tracked and detected during the machining process.

The determined wear condition parameters can be indicated in terms of quantity by means of a two-dimensional or three-dimensional representation of the tool on a display unit, whereby the quantitative and the qualitative wear condition of the tool is immediately recognizable for the operator of the machine tool 1.

The quantity of wear can e.g. be shown by different colours on the display. By defining wear condition limit values or limit values for the rise of the measuring signals excessively worn contact zones may be e.g. marked in red. The operator can thus see whether the tool is still usable for certain production programs.

Although preferred embodiments of the invention have been specifically illustrated and described herein, it is to be understood that minor variations may be made without departing from the spirit and scope of the invention, as defined in the appended claims.

What is claimed is:

1. A method of monitoring the wear condition of a milling tool (2) during the machining of a metal workpiece (4) comprising the steps of
   (a) detecting vibrations of both the milling tool (2) and the metal workpiece (4) at varying cutting, engagement and/or contact conditions between the milling tool (2) and the workpiece (4) at different locations along the workpiece (4),
   (b) generating measuring signals from the detected vibrations,
   (c) transforming the measuring signals into wavelet coefficients through wavelet functions,
   (d) calculating wear condition parameters for the milling tool (2) from the resultant wavelet coefficients,
   (e) repeating the performance of steps (a) through (c) at at least another location along one of the metal workpiece (4) or a different workpiece and the milling tool (2) under comparable cutting, engagement and/or contact conditions, and
   (f) evaluating the wear condition of the workpiece on the basis of changes in the wear condition parameter of step (d) to that resulting from the performance of step (e).

2. The monitoring method as defined in claim 1 wherein step (a) is performed by detecting vibrations in three-dimensional space along at least one space-defining axis.

3. The monitoring method as defined in claim 1 wherein step (a) is performed by detecting vibrations in three-dimensional space along all three space-defining axes.

4. The monitoring method as defined in claim 3 including performing steps (b) through (d) with respect to the detected vibrations of each of the three space-defining axes incident to performing step (f).

5. The monitoring method as defined in claim 3 including performing steps (b) through (d) with respect to the detected vibrations of each of the three space-defining axes to define three wavelet coefficients, and combining the three wavelet coefficients into a single wavelet coefficient incident to performing step (f).

6. The monitoring method as defined in claim 1 wherein step (a) is performed by detecting vibrations of at least one of (a) the milling tool (2), (b) a milling tool holder, (c) a milling machine milling tool holder support, (d) the workpiece and (e) the machine tool workpiece support.

7. The monitoring method as defined in claim 1 wherein step (a) is performed by utilizing one of an acceleration sensor, a vibration velocity sensor, a vibration path sensor, a solid-borne sound sensor and a sound emission sensor.

8. The monitoring method as defined in claim 1 including the step of monitoring the wear condition of the tool (2) during milling cut interruption.

9. The monitoring method as defined in claim 1 including the step of monitoring the wear condition of the tool (2) during milling tool workpiece cutting.

10. The monitoring method as defined in claim 1 wherein the different locations of step (a) are determined from data of a NC production program of the machine tool.

11. The monitoring method as defined in claim 1 wherein the different locations of step (a) are determined from one of (a) workpiece blank geometry, (b) workpiece finished part geometry, (c) workpiece intermediate cut geometry, (d) machining parameters and (e) tool geometry data of a NC production program of the machine tool.

12. The monitoring method as defined in claim 1 including the step of displaying the wear condition of the milling tool by one of (a) two-dimensional and (b) a three-dimensional representation of a cutting edge of the milling tool.

13. A method of monitoring the wear condition of a milling tool (2) during the machining of a metal workpiece (4) comprising the steps of
   (a) detecting vibrations of both the milling tool (2) and the metal workpiece (4) at varying cutting, engagement and/or contact conditions between the milling tool (2) and the workpiece (4) at different locations along the workpiece (4),
   (b) generating measuring signals from the detected vibrations,
   (c) transforming the measuring signals into wavelet coefficients through wavelet functions,
   (d) calculating wear condition parameters for the milling tool (2) from the resultant wavelet coefficients,
   (e) repeating the performance of steps (a) through (c) at at least another location along a different workpiece and the milling tool (2) under comparable cutting, engagement and/or contact conditions, and
   (f) evaluating the wear condition of the workpiece on the basis of changes in the wear condition parameter of step (d) to one of (a) an initial tool parameter and (b) a parameter at comparable cutting, engagement and/or contact conditions of one of a (a) similar and (b) different workpiece (4).

14. The monitoring method as defined in claim 13 including the step of displaying the wear condition of the milling tool by one of (a) two-dimensional and (b) a three-dimensional representation of a cutting edge of the milling tool.

15. A method of monitoring the wear condition of a milling tool (2) during the machining of a metal workpiece (4) comprising the steps of
   (a) detecting vibrations of both the milling tool (2) and the metal workpiece (4) at varying cutting, engagement and/or contact conditions between the milling tool (2) and the workpiece (4) at different locations along the workpiece (4),
   (b) generating measuring signals from the detected vibrations,
   (c) transforming the measuring signals into wavelet coefficients through wavelet functions,
   (d) calculating wear condition parameters for the milling tool (2) from the resultant wavelet coefficients,
   (e) repeating the performance of steps (a) through (c) at at least another location along one of the metal workpiece (4) or a different workpiece and the milling tool (2) under comparable cutting, engagement and/or contact conditions, and (f) evaluating the wear condition of the workpiece on the basis of changes in the wear condition parameter of step (d) at the different locations of step (a) with comparable cutting, engagement and/or contact conditions of one of (a) a similar and (b) different workpiece.

16. The monitoring method as defined in claim 15 wherein step (a) is performed by detecting vibrations in three-dimensional space along at least one space-defining axis.

17. The monitoring method as defined in claim 15 wherein step (a) is performed by detecting vibrations in three-dimensional space along all three space-defining axes.

18. The monitoring method as defined in claim 15 including performing steps (b) through (d) with respect to the detected vibrations of each of the three space-defining axes incident to performing step (f).

19. The monitoring method as defined in claim 15 including performing steps (b) through (d) with respect to the detected vibrations of each of the three space-defining axes to define three wavelet coefficients, and combining the three wavelet coefficients into a single wavelet coefficient incident to performing step (f).

20. The monitoring method as defined in claim 15 wherein step (a) is performed by detecting vibrations of at least one of (a) the milling tool (2), (b) a milling tool holder, (c) a milling machine milling tool holder support, (d) the workpiece and (e) the machine tool workpiece support.

21. The monitoring method as defined in claim 15 wherein step (a) is performed by utilizing one of an acceleration sensor, a vibration velocity sensor, a vibration path sensor, a solid-borne sound sensor and a sound emission sensor.

22. The monitoring method as defined in claim 15 including the step of monitoring the wear condition of the tool (2) during milling cut interruption.

23. The monitoring method as defined in claim 15 including the step of monitoring the wear condition of the tool (2) during milling tool workpiece cutting.

24. The monitoring method as defined in claim 15 wherein the different locations of step (a) are determined from data of a NC production program of the machine tool.

25. The monitoring method as defined in claim 15 wherein the different locations of step (a) are determined from one of (a) workpiece blank geometry, (b) workpiece finished part geometry, (c) workpiece intermediate cut geometry, (d) machining parameters and (e) tool geometry data of a NC production program of the machine tool.

26. The monitoring method as defined in claim 15 including the step of displaying the wear condition of the milling tool by one of (a) two-dimensional and (b) a three-dimensional representation of a cutting edge of the milling tool.

* * * * *